United States Patent
Rupasinghe et al.

(10) Patent No.: US 12,273,160 B2
(45) Date of Patent: Apr. 8, 2025

(54) METHODS OF EXTENDING TYPE II PORT SELECTION CODEBOOK FOR SUPPORTING HIGHER RANK TRANSMISSION

(71) Applicant: NTT DOCOMO, INC., Tokyo (JP)

(72) Inventors: Nadisanka Rupasinghe, Sunnyvale, CA (US); Yuki Matsumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 7 days.

(21) Appl. No.: 18/255,478

(22) PCT Filed: Dec. 16, 2021

(86) PCT No.: PCT/US2021/072961
§ 371 (c)(1),
(2) Date: Jun. 1, 2023

(87) PCT Pub. No.: WO2022/133471
PCT Pub. Date: Jun. 23, 2022

(65) Prior Publication Data
US 2024/0022289 A1    Jan. 18, 2024

Related U.S. Application Data

(60) Provisional application No. 63/127,633, filed on Dec. 18, 2020.

(51) Int. Cl.
*H04B 7/0417*    (2017.01)
*H04B 7/0456*    (2017.01)
*H04B 7/06*    (2006.01)

(52) U.S. Cl.
CPC ......... *H04B 7/0417* (2013.01); *H04B 7/0478* (2013.01); *H04B 7/0626* (2013.01)

(58) Field of Classification Search
CPC ... H04W 72/23; H04W 72/232; H04W 72/21; H04W 24/10; H04W 52/146;
(Continued)

(56) References Cited

U.S. PATENT DOCUMENTS 10,812,236 B2 * 10/2020 Yum ..................... H04B 7/0626
2021/0044385 A1 * 2/2021 Hosseini .................. H04L 1/08
(Continued)

OTHER PUBLICATIONS

International Preliminary Report on Patentability from PCT/US2021/072961 issued on Jun. 13, 2023 (14 pages).
(Continued)

*Primary Examiner* — Eva Y Puente
(74) *Attorney, Agent, or Firm* — Osha Bergman Watanabe & Burton LLP (57) ABSTRACT

A terminal for performing Channel State Information (CSI) reporting for type II port selection codebook includes a receiver that receives beamformed CSI reference signal (RS) ports comprising spatial domain (SD) beams and frequency domain (FD) base. In addition, the terminal includes a processor that, using higher layer signaling, configures a number of SD beam selection and a number of FD base selection, and selects a first value from a first set of values for the number of SD beam selection and a second value from a second set of values for the number of FD base section. The terminal further includes a transmitter that transmits the first value and the second values.

4 Claims, 8 Drawing Sheets

UE selects best L CSI-RS ports and reports those selected beams to gNB (58) Field of Classification Search
CPC . H04W 56/001; H04W 52/242; H04W 52/42; H04L 5/0048; H04L 5/0051; H04L 5/0094; H04L 5/005; H04L 5/0057; H04L 5/0023; H04L 5/0053; H04L 1/0026; H04J 11/005; H04J 13/16; H04J 11/0079; H04J 13/00; H04J 99/00; H04J 1/16; H04J 11/0073; H04J 11/0076; H04J 11/0069; H04B 7/0626; H04B 7/0478; H04B 7/0639; H04B 7/0456; H04B 7/0617; H04B 7/088; H04B 7/0632; H04B 7/0658
USPC .......................................................... 375/267
See application file for complete search history.

(56) References Cited

U.S. PATENT DOCUMENTS

| | | | | |
|---|---|---|---|---|
| 2023/0131045 A1* | 4/2023 | Huang | .................. | H04L 5/0023 375/267 |
| 2023/0283341 A1* | 9/2023 | Hajri | .................... | H04W 72/23 370/329 |
| 2024/0048195 A1* | 2/2024 | Hindy | .................. | H04B 7/0456 |
| 2024/0048325 A1* | 2/2024 | Hao | ....................... | H04L 5/005 |

OTHER PUBLICATIONS

International Search Report issued in PCT/US2021/072961 on Apr. 26, 2022 (4 pages).
Written Opinion of the International Searching Authority issued in PCT/US2021/072961 on Apr. 26, 2022 (13 pages).
Nokia, Nokia Shanghai Bell; "Enhancement on CSI measurement and reporting"; Gpp TSG RAN WG1 Meeting #103-e, R1-2008909; e-Meeting; Oct. 26-Nov. 13, 2020 (21 pages).
NTT Docomo, Inc.; "Discussion on CSI enhancements"; 3GPP TSG RAN WG1 #103-e, R1-2009180; e-Meeting; Oct. 26-Nov. 13, 2020 (11 pages).
Huawei, HiSilicon; "Summary of Further Email discussion for Rel-17 CSI enhancements"; 3GPP TSG RAN WG1 Meeting #103-e, R1-2009530; E-meeting; Oct. 26-Nov. 13, 2020 (46 pages).
Samsung; "New WID: Further enhancements on MIMO for NR"; 3GPP TSG RAN WG1 Meeting #86, RP-193133; Sitges, Spain; Dec. 9-12, 2019 (14 pages).
3GPP TS 38.214 V16.2.0; "3rd Generation Partnership Project; Technical Specification Group Radio Access Network; NR; Physical layer prodedures for data (Release 16)"; Jun. 2020 (163 pages).

* cited by examiner

FIG. 1

UE selects best L CSI-RS ports and reports those selected beams to gNB

FIG. 2

Example: Let, $K = 8, L = 2$

Case 1: $d = 2$

$i_{1,1} = \{0, 1\}$

Available port-pairs for selection = {B1, B2}, {B3, B4}

Case 2: $d = 1$ $i_{1,1} = \{0, 1, 2, 3\}$

Available port-pairs for selection = {B1, B2}, {B2, B3}, {B3, B4}, {B4, B1}

FIG. 3

Table 5.2.2.2.5-1: Codebook parameter configurations for $L$, $\beta$ and $p_v$

| paramCombination-r16 | $L$ | $p_v$ | | $\beta$ |
| --- | --- | --- | --- | --- |
| | | $v \in \{1,2\}$ | $v \in \{3,4\}$ | |
| 1 | 2 | ¼ | 1/8 | ¼ |
| 2 | 2 | ¼ | 1/8 | ½ |
| 3 | 4 | ¼ | 1/8 | ¼ |
| 4 | 4 | ¼ | 1/8 | ½ |
| 5 | 4 | ¼ | ¼ | ¾ |
| 6 | 4 | ½ | ¼ | ½ |
| 7 | 6 | ¼ | - | ½ |
| 8 | 6 | ¼ | - | ¾ |

FIG. 4

Overview of layers and layer-groups

METHODS OF EXTENDING TYPE II PORT SELECTION CODEBOOK FOR SUPPORTING HIGHER RANK TRANSMISSION

TECHNICAL FIELD

One or more embodiments disclosed herein relate to methods of extending Type II port selection codebook for higher rank transmissions.

BACKGROUND

New Radio (NR) supports Type II channel state information (CSI) feedback for rank 1 and rank 2 (3GPP Release 15 of NR).

One or more new working items relating to NR Multiple Input Multiple Output (MIMO) for Release 17 of NR identify requirements for further enhancing a Type II port selection codebook.

For example, with regard to enhancement on CSI measurement and reporting it may be evaluated and, if needed, specify CSI reporting for DL multi-TRP and/or multi-panel transmission to enable more dynamic channel/interference hypotheses for NCJT, targeting both FR1 and FR2.

Further, it may be evaluated and, if needed, specify Type II port selection codebook enhancement (based on Rel. 15/16 Type II port selection) where information related to angle(s) and delay(s) are estimated at the gNode-B (gNB) based on Sounding Reference Signal (SRS) by utilizing downlink (DL)/uplink (UL) reciprocity of angle and delay, and the remaining DL Channel State Information (CSI) is reported by the user equipment (UE), mainly targeting Frequency Division Duplexing (FDD) Frequency Range 1 (FR1) to achieve better trade-off among UE complexity, performance and reporting overhead.

CITATION LIST

Non-Patent Reference

[Non-Patent Reference 1] 3GPP RP 193133, "New WID: Further enhancements on MIMO for NR", December 2019.

[Non-Patent Reference 2] 3GPP TS 38.214, "NR; Physical layer procedures for data (Release 16)."

SUMMARY

One of more embodiments provide that Type II port selection codebook can be further extended for supporting higher rank transmission especially taking into consideration angle-delay reciprocity of propagation channel.

In general, in one aspect, embodiments disclosed herein relate to a method is that performs CSI reporting for type II port selection codebook. The method may include configuring a number of beamformed SD ports or SD-FD ports, K and a number of beamformed FD ports, and K'.

In general, in one aspect, embodiments disclosed herein relate to a method for performing CSI reporting for type II port selection codebook including configuring $L_l$ and $M_l$ per layer.

In general, in one aspect, embodiments disclosed herein relate to a method for performing CSI reporting for type II port selection codebook including selecting one or more ports for SD and FD bases separately for each layer.

In general, in one aspect, embodiments disclosed herein relate to a method for performing CSI reporting for type II port selection codebook including selecting one or more ports for SD and FD bases jointly for each layer.

Advantageously, enhancements on CSI measurement and reporting are being discussed in the development of Release 17 of NR. One of such enhancements includes evaluating and, if needed, specifying CSI reporting for Downlink (DL) multi-Transmission Reception Points (TRP) and/or multi-panel transmission to enable more dynamic channel/interference hypotheses for non-coherent joint transmission (NCJT), targeting both Frequency Range 1 (FR1) (i.e., 410 MHz to 7,125 MHz, sub-6 GHz) and Frequency Range 2 (FR2) (i.e., 24,250 MHz to 52,600 MHz, mmWaves). Another of such enhancements includes evaluating and, if needed, specifying Type II port selection codebook enhancements (based on Rel15/16 Type II port selection) where information related to angle(s) and delay(s) are estimated at a gNB based on Sound Reference Signal (SRS) by utilizing DL/Uplink (UL) reciprocity of angle and delay. The remaining DL CSI is reported by the UE, mainly targeting Frequency Division Duplex (FDD) FR1 to achieve better trade-off among UE complexities, performance, and reporting overhead.

Other aspects of the disclosure will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

One or more embodiments of the invention disclosed herein related to how Type II port selection codebook can be further extended for supporting higher rank transmission especially taking into consideration angle-delay reciprocity of propagation channel.

Figure 1:
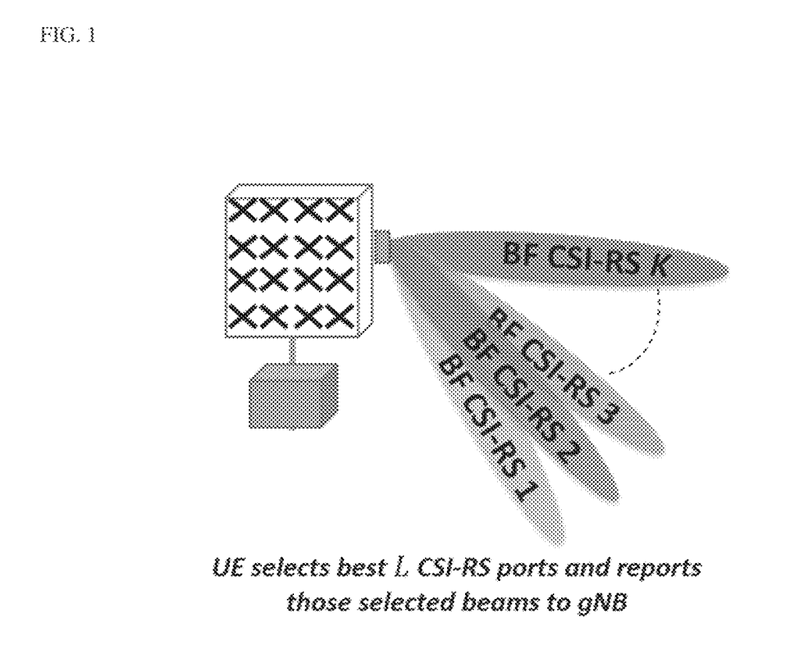
FIG. 1 shows an example of a user equipment selecting a best L Channel State Information Reference Signal ports and reporting the selected beams to a gNB, in accordance with one or more embodiments.

At the outset, we discuss an overview of the Rel. 16 Type II Port Selection Codebook (CB) with reference to FIG. 1. Type II port selection CB does not require a user equipment (UE) to derive spatial domain (SD) beams considering 2D-DFT basis as in a regular Type II CB.

Instead, a gNB transmits K beamformed Channel State Information Reference Signal (CSI-RS) ports considering set of SD beams. In this example, a UE has to identify L(≤K) best CSI-RS ports (e.g., corresponding to beams) and report their indices within $W_1$.

SB-wise precoding vector generation for layer l∈ {1, 2, 3, 4} [2] is defined by $W_l(N_t \times N_3) = QW_{1,l}\tilde{W}_l W_{f,l}^H$ equation (1) with parameters defined as follows:

Q($N_t \times K$): K SD beams used for CSI-RS beamforming
$W_1$(K×2L): Block diagonal matrix
$\tilde{W}_l$(2L×M): Linear combination (LC) coefficient matrix
$W_{f,l}$($N_3$×M): DFT basis vectors (FD bases)
$N_3$: Number of sub-bands
M: Number of FD basis vectors In this example, a number of CSI-RS ports, K, is configured by higher layers such as in accordance with $P_{CSI-RS}$∈{4, 8, 12, 16, 24, 32}. $W_1$ consists of column vectors from an identity matrix. The column vectors correspond to selected beams. A number of ports (i.e., beams) to be selected, L, is higher layer configured in accordance with L∈{2, 3, 4} when $P_{CSI-RS}$>4. SD beams within Q are selected transparent to the UE. In addition, the SD beams can be determined based on sounding reference signals (SRS) or UL Demodulation Reference Signal (DMRS) transmission.

Figure 2:
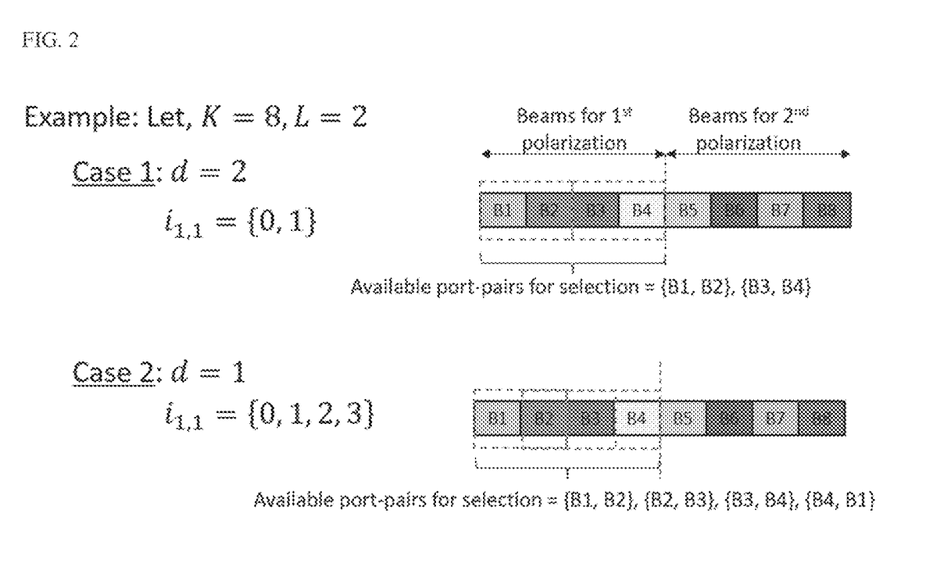
FIG. 2 shows an example of port-pair selection, in accordance with one or more embodiments.

Turning to FIG. 2, reporting of $W_1$ based on Selected Beams is discussed in accordance with one or more embodiments. Parameter d is configured by the gNB and determines the sampling granularity of port groups. For example, In Rel. 16, d is configured as, d∈{1, 2, 3, 4} and d≤L. Further, a UE reports $i_{1,1}$ as part of PMI to select L beams [2] where $i_{l,l}$∈

$$\left\{0, 1, K, \left\lceil \frac{P_{CSI-RS}}{2d} \right\rceil - 1\right\}.$$

For example, in FIG. 2 it may be assumed K=8 and L=2. Thus, in Case 1 shown in FIG. 2, d=2 and $i_{1,1}$={0,1}. Under Case 1, available port-pairs for selection are {B1,B2}, {B3,B4}. In Case 2 of the examples shown in FIG. 2, d=1 and $i_{1,1}$={0, 1, 2, 3}. Under Case 2, available port-pairs for selection are {B1, B2}, {B2, B3}, {B3, B4}, {B4, B1}.

In the examples in accordance with FIG. 2, parameters are defined by the following formulas:

$$W_1 = \begin{bmatrix} E & 0 \\ 0 & E \end{bmatrix}$$

-continued $$E = \left[ e_{mod(i_{1,1}d,k/2)}^{K/2} \quad e_{mod(i_{1,1}d+1,k/2)}^{K/2} \right]$$

$e_l^{K/2}$

A(K/2×1) vector with all zeros except 1 at $l^{th}$ location

One or more embodiments relating to Type II Port Selection (PS) Codebook Structures will now be discussed. A general structure for SB-wise precoder generation for Rel. 17 port selection (PS) codebook considering l-th layer can be given as follows in equation (2):

$$W_l(N_t \times N_3) = QW_{1,l}\tilde{W}_l(SW_{f,l})^H$$
$$= Q(W_{1,l}\tilde{W}_l W_{f,l}^H)S^H$$

Where parameters are defined as:
Q=[$b_1 b_2 \ldots b_K$]
S=[$f_1 f_2 \ldots f_{K'}$]
Q($N_t$×K): K beamformed ports for SD beam selection
Note: $b_i$, i∈{1, 2, ... K}: i-th SD basis vector
S($N_3$×K'): K' beamformed ports for FD basis selection
Note: $f_j$, j∈{1, 2, ... K'}: j-th FD basis vector
$W_{1,l}$(K×2$L_l$): Block diagonal matrix where each matrix block consisting of $L_l$ columns from an (K×K) identity matrix
$W_{f,l}$(K'×$M_l$): A matrix consisting of columns from an (K'×K') identity matrix
$\tilde{W}_l$(2$L_l$×$M_l$): Linear combination coefficient matrix It is noted that compared to Rel. 16 PS codebook in (2), CSI-RS beamforming is done both in SD and FD domains. FD bases for beamforming can be determined considering delay reciprocity.

In this example, a gNB transmits (K×K') beamformed SD and FD ports. Selection of K SD beams and K'FD bases is transparent to UE. A UE selects $L_l$ ports out of K SD beams and $M_l$ ports out of K' FD bases for l-th layer and report them back to the gNB as part of PMI ($W_1$ and $W_{f,l}$ captures selected SD and FD bases). In addition, the UE reports LC coefficients in $\tilde{W}_l$ as well.

One or more embodiments of Type II Port Selection Codebook will now be discussed from the perspective of the UE.

Note that, equation (2) captures the final precoder generated at the network (NW) side considering reported port selection matrices $W_{1,l}$ and $W_{f,l}$ by the UE. However, from the UE's perspective, since Q and S are not known to the UE, the final SB-wise precoder for l-th layer looks as follows:

$$W_l(N_t \times N_3) = W_{1,l}\tilde{W}_l W_{f,l}^H \qquad \text{Equation (3)}$$

Note that, equation (3) captures precoder generation when separate SD beams and FD bases selection is configured.

Further, it is possible to support a codebook structure without allowing the UE to select SD and FD bases separately (hence joint SD-FD selection). This can be explicitly given as:

$$W_l(N_t \times N_3) = W_{1,l} W_2 \qquad \text{Equation (4)}$$

Equation (4) captures precoder generation when Joint SD-FD bases selection is configured.

Here, $W_{1,l}$ is a block diagonal matrix with each matrix block consisting of $L_l$ columns from an (K×K) identity matrix (considering polarization common/specific selection). In additional examples, we discuss:
  How to configure K and K'
  How to configure $L_l$ and $M_l$ for each layer l∈{1, 2, ... υ}. Here υ is the rank
  How ports associated with SD beams and FD bases are selected for each layer based on configured $L_l$ and $M_l$ First Example Embodiment One or more embodiments in accordance with a first example relate to configuring K and K'.

K represents a number of bases to consider for SD beam selection (eq. (3)) or SD-FD pair selection (eq. (4)), while K' represents a number of bases to consider for FD basis selection (eq. (3)).

K and/or K' can be configured using higher layer signaling or x-bit(s) in downlink control information (DCI).

In an example, a set of values for K are defined in the specifications (e.g., 3GPP NR Specifications) and, using higher layer signaling or DCI, one value out of those can be selected, such as for example, K∈{4, 8, 12, 16, 24, 32}. Then using higher layer signaling or DCI, one value out of 6 possible values for K is selected.

In this example and in the following options and examples, it is also possible that multiple sets of values may be defined in the specifications. In this scenario, first one of the multiple sets of values is selected using higher layer signaling or DCI and then one value out of the selected set of values is selected. In yet another alternative scenario, multiple sets of values may be configured using higher layer signaling and one of the sets of values may be selected out using higher layer signaling or DCI. Subsequently, one value out of the selected set of values is selected.

In a potential option under this example, K can be directly configured using higher-layer signaling or DCI. Alternatively, in another option, K is derived from the configured number of CSI-RS ports.

In another example, K is defined as a product of two parameters, $O_f$ and $\overline{K}$, $K = O_f \times \overline{K}$. Here, a set of values for $O_f$ and/or $\overline{K}$ are defined in the specifications, and using higher layer signaling or DCI, value(s) for $O_f$ and/or $\overline{K}$ are selected. For example, Let $\overline{K}$∈{4, 8, 12, 16, 24, 32} and $O_f$∈{1, 2}, then using higher layer signaling or DCI, values for $\overline{K}$ and $O_f$ are selected.

In a potential option under this example, $O_f$ and/or $\overline{K}$ can be directly configured using higher-layer signaling or DCI.

Alternatively, $O_f$ is configured using higher layer signaling or DCI and $\overline{K}$ is derived from the configured number of CSI-RS ports.

In another example, a set of values for K' are defined in the specifications, and using higher layer signaling or DCI, one value out of those can be selected. For example, let K'∈{4, 8, 12, 16, 24, 32}, then using higher layer signaling or DCI one value out of 6 possible values is selected.

In an option under this example, K' can be directly configured using higher-layer signaling or DCI.

Alternatively, K' is derived from the configured number of CSI-RS ports.

In another example, K' is defined as a product of two parameters, $O_f$ and $\overline{K}'$ as $K' = O_f \times \overline{K}'$. Here, a set of values for $O_f$ and/or $\overline{K}'$ are defined in the specifications, and using higher layer signaling or DCI, value(s) for $O_f$ and/or $\overline{K}'$ are selected. For example, let $\overline{K}'$∈{4, 8, 12, 16, 24, 32} and $O_f$∈{1, 2}, then using higher layer signaling or DCI values for $\overline{K}'$ and $O_f$ are selected.

In an option under this example, $O_f$ and/or $\overline{K}'$ can be directly configured using higher-layer signaling or DCI.

Alternatively, $O_f$ is configured using higher layer signaling or DCI and $\overline{K}$ is derived from the configured number of CSI-RS ports.

In another example, if K=K' then configuring either K or K' is sufficient.

In another example, K and/or K' are pre-defined in the specifications.

Second Example Embodiment

One or more embodiments in accordance with the second example relate to configuring $L_l$ and $M_l$ per Layer.

As captured in equations (3) and (4), a UE needs to be configured with number of ports $L_l$ and $M_l$ for selecting for each layer of a given rank, Rank Indicator (RI)=υ. These can be configured using higher layer signaling or x-bit(s) in DCI.

In an example, all the layers of a given rank, RI=υ, are configured with the same $(L_l, M_l)$(Layer-common). For example, let $L_{l_1} = L_{l_2} = L$ and $M_{l_1} = M_{l_2} = M$; $l_1, l_2 \in \{1, 2, 3, 4\}$ and $l_1 \neq l_2$, then at each layer L ports associated with SD beams and M ports associated with FD basis vectors will be selected.

In an option under this example, (L, M) are configured using higher layer signaling or x-bit(s) in DCI.

Alternatively, a set of values for (L, M) are defined in the specifications and, using higher layer signaling or x-bit(s) in DCI, one value out of those defined values is selected. For example, consider FIG. 3 describing Table 5.2.2.2.5-1 of [2]. Note that, a number of ports for FD bases is calculated as $$M = M_v = \left\lceil p_v \frac{N_3}{R} \right\rceil,$$

Figure 3:
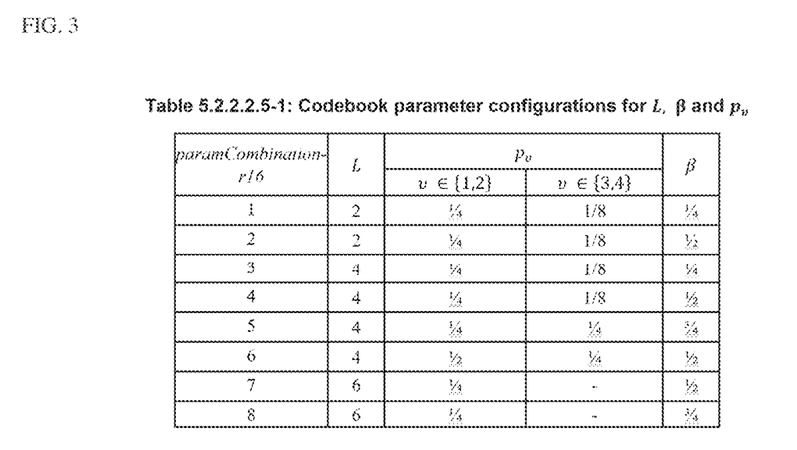
FIG. 3 shows an example table describing codebook parameter configurations, in accordance with one or more embodiments.

R∈{1, 2}. Then using 3-bits, the NW selects one out of 8 combinations to configure L and $P_v$.

In another option under this example, if a UE is not configured with values of L and/or M, the UE considers pre-determined values for L and/or M in the specifications.

Note that, hereinafter, M and p may be interchangeably used to represent number of ports for FD bases selection.

Figure 4:
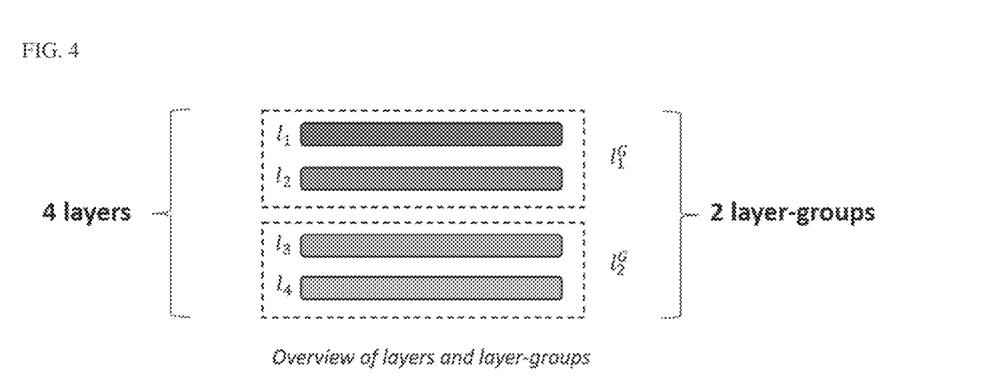
FIG. 4 shows an example overview of layers and layer-groups, in accordance with one or more embodiments.

In another example and with reference to FIG. 4, $(L_l, M_l)$ is layer-group-specific for a given rank, RI=υ. Hence, a same number of ports for SD beams and FD bases are selected for layers within a layer-group (Layer-group-specific). For example, available layers of rank, RI=υ are grouped such that a number of layer-groups are given as G(≤υ). Then the $g^{th}$ layer-group, $1_g^G$ will be configured $(L_g, M_g)$, g∈{1, 2, . . . G} with $L_g$ ports and $M_g$ ports respectively for selecting SD beams and FD basis vectors. Note that, as discussed under the first example embodiment, $M_g$ can be calculated considering the configured $p_g$ as follows, $$M_g = \left\lceil p_g \frac{N_3}{R} \right\rceil$$

For example, as shown in FIG. 4, let RI=4, and number of layer-groups, G=2.

In an option under this example, a UE assumes $\{L_1, \ldots L_g\}$ and/or $\{p_1, \ldots p_G\}$ to be configured by higher layer parameters. If the UE is not configured with values of $\{L_1 \ldots L_G\}$ and/or $\{p_1 \ldots p_G\}$, the UE considers pre-determined values for $\{L_1, \ldots L_G\}$ and/or $\{p_1, \ldots p_G\}$ in the specifications.

In another option under this example, a UE assumes to be configured with value sets for $\{L_1, \ldots L_G\}$ and/or $\{p_1, \ldots p_G\}$ by higher layer parameter(s), and the UE assumes one value set for $\{L_1, \ldots L_G\}$ and/or $\{p_1, \ldots p_G\}$ as indicated by x-bit(s) DCI or using higher layer signaling. For example, x is specified in the specifications as, e.g., x=2. As another example, x is flexible depending on the number of values per one set, which are configured by higher layer signaling. For example, if 4 value sets are configured, the UE assumes 2 bits in DCI; if 8 value sets are configured, the UE assumes 3 bits in DCI.

In another option under this example, a UE assumes value sets for $\{L_1, \ldots L_G\}$ and/or $\{p_1, \ldots p_G\}$ are pre-determined and/or specified in the specifications, and the UE assumes one value set out of those sets as indicated by x-bit(s) DCI. For example, x is specified in the specifications as x=2.

In another example, it may not be restricted to assigning layer-common (as discussed under the first example embodiment) L or M (for SD or FD basis selection) while the other parameter is configured as layer-group-specific assignment. For example, for SD beams $L_g$, $g \in \{1, 2, \ldots G\}$ is layer-group-common, $L_{g_1} = L_{g_2}$ with $g_1, g_2 \in \{1, 2, \ldots G\}$ and $g_1 \neq g_2$, while for FD basis a subset $p_g$, $g \in \{1, 2, \ldots G\}$ is layer-group specific.

In another example, it may not be restricted to having single layer groups, i.e., $G=\upsilon$ either for SD or FD basis selection or for both. This will make (L, M) assignment layer-specific.

In an option under the two foregoing examples, a UE assumes $\{L_1, \ldots L_G\}$ and/or $\{p_1, \ldots p_G\}$ to be configured by higher layer parameters. If the UE is not configured with values of $\{L_1, \ldots L_G\}$ and/or $\{p_1, \ldots p_G\}$, the UE considers pre-determined values for $\{L_1, \ldots L_G\}$ and/or $\{p_1, \ldots p_G\}$ in the specifications.

In another option under the two foregoing examples, a UE assumes to be configured with value sets for $\{L_1, \ldots L_G\}$ and/or $\{p_1, \ldots p_G\}$ by higher layer parameter(s), and the UE assumes one value set for $\{L_1, \ldots L_G\}$ and/or $\{p_1, \ldots p_G\}$ as indicated by x-bit(s) DCI or using higher layer signaling. For example, x is specified in the specifications as, e.g., x=2. As another example, x is flexible depending on the number of values per one set, which are configured by higher layer signaling. For example, if 4 value sets are configured, the UE assumes 2 bits in DCI; if 8 value sets are configured, the UE assumes 3 bits in DCI.

In another option under the two foregoing examples, a UE assumes value sets for $\{L_1, \ldots L_G\}$ and/or $\{p_1, \ldots p_G\}$ are pre-determined and/or specified in the specifications, and the UE assumes one value set out of those sets as indicated by x-bit(s) DCI. For example, x is specified in the specifications as x=2.

Alternative Second Example Embodiment

One or more embodiments in accordance with the second example relate to configuring a number of layer-groups G.

In an example, a number of layer-groups, G, is pre-determined in the specifications.

In an option under this example, G is defined to be equal to the identified rank, RI=$\upsilon$.

In another option under this example, G is defined to be equal to $\upsilon/q$, where $\upsilon$ is the identified rank and q is configured using higher-layer signaling or DCI.

In another example, a number of layer-groups, G, is configured using higher-layer signaling or x-bit(s) in DCI.

In an option under this example, G is directly configured using higher-layer signaling or x-bit(s) in DCI.

In another option under this example, a set of values for G is defined in the specifications, and using higher-layer signaling or x-bit(s) in DCI, one value out of those are selected. For example, let $G \in \{1, 2, 4\}$, then using x=2 bits one value for G is selected.

In another example, a number of layers per layer-group is pre-determined in the specifications. Note that, when number of layers per group, say $n^G$, is known, $$G = \left\lceil \frac{\upsilon}{n^G} \right\rceil.$$

In another example, a number of layers per layer-group, $n^G$, is configured using higher-layer signaling or x-bit(s) in DCI.

In an option under this example, $n^G$ is directly configured using higher-layer signaling or x-bit(s) in DCI.

In another option under this example, a set of values for $n^G$ is defined in the specifications, and using higher-layer signaling or x-bit(s) in DCI, one value out of those is selected. For example, let $n^G \in \{1, 2, 4\}$, then using x=2 bits, one value for $n^G$ is selected.

Third Example Embodiment

One or more embodiments in accordance with the third example relate to port selection for separate SD beams and FD bases selection.

Following the precoder generation in equation (3), port selection has to be done for selecting both SD beams and FD bases. In particular, selection matrix $W_{1,l}$ captures selected ports associated with SD beams, whereas selection matrix $W_{f,l}$ captures selected ports associated with FD basis vectors.

When (L, M) values are layer-common, port selection matrices, $W_{1,l}$ and $W_{f,l}$ can be determined as follows:

In an option under this example, a common set of ports are selected by selection matrices $W_{1,l}$ and $W_{f,l}$ of all layers in given rank, RI=$\upsilon$. For all layers in RI=$\upsilon$, the same L ports out of K beamformed ports are selected. Hence, $W_{1,l_1} = W_{1,l_2}$; $l_1, l_2 \in \{1, 2, \ldots, \upsilon\}$, $l_1 \neq l_2$. For all layers in RI=$\upsilon$, the same M ports out of K' beamformed ports are selected. Hence, $W_{f,l_1} = W_{f,l_2}$; $l_1, l_2 \in \{1, 2, \ldots, \upsilon\}$, $l_1 \neq l_2$.

In another option under this example, a common set of ports are selected for SD beams across all layers while ports are independently selected for FD bases of each layer. For all layers in RI=$\upsilon$, the same L ports out of K beamformed ports are selected. Hence, $W_{1,l_1} = W_{1,l_2}$; $l_1, l_2 \in \{1, 2, \ldots, \upsilon\}$, $l_1 \neq l_2$. Ports are independently selected at each layer for FD bases selection. Hence, $W_{f,l_1} \neq W_{f,l_2}$; $l_1, l_2 \in \{1, 2, \ldots \upsilon\}$, $l_1 \neq l_2$.

In another option under this example, a common set of ports are selected for FD bases across all layers while ports are independently selected for SD beams of each layer. For all layers in RI=$\upsilon$, the same M ports out of K' beamformed ports are selected. Hence, $W_{f,l_1} = W_{f,l_2}$; $l_1, l_2 \in \{1, 2, \ldots \upsilon\}$, $l_1 \neq l_2$. Ports are independently selected at each layer for SD beams selection. Hence, $W_{1,l_1} \neq W_{1,l_2}$; $l_1, l_2 \in \{1, 2, \ldots \upsilon\}$, $l_1 \neq l_2$.

In another option under this example, ports are independently selected for both SD beams and FD bases of each layer. Ports are independently selected at each layer for SD beams selection. Hence, $W_{1,l_1}=W_{1,l_2}$; $l_1,l_2\in\{1, 2, \ldots \upsilon\}$, $l_1\neq l_2$. Ports are independently selected at each layer for FD bases selection. Hence, $W_{f,l_1}=W_{f,l_2}$; $l_1,l_2\in\{1, 2, \ldots \upsilon\}$, $l_1\neq l_2$.

There are a few items of note in the foregoing examples and options under the third example embodiment. As a first note, ports associated with SD beams and FD bases may be freely selected or selected as defined in Rel. 15/16, as discussed above. As a second note, it is possible to configure no port selection for all layers. In that case, UE reports only $\tilde{W}_l$ associated with each layer. As a third note, out of the above four options under this third example embodiment, one option may be configured using higher-layer signaling or DCI. It is also possible that the specifications directly define one option.

Fourth Example Embodiment

One or more embodiments in accordance with the fourth example relate to port selection for joint SD-FD selection. Following the precoder generation in equation (4), port selection has to be done for selecting SD and FD bases jointly. In particular, selection matrix $W_{1,l}$ captures selected ports associated with SD-FD pairs. Also, note that only $L_l$ (i.e., number of ports for selecting SD-FD pairs) needs to be configured. Examples discussed under the second example embodiment can be used for configuring $L_l$.

When L is layer-common, port selection matrix, $W_{1,l}$ can be determined as follows:

In an option under this example, a common set of ports are selected by selection matrices $W_{1,l}$ of all layers in a given rank, RI=$\upsilon$. For all layers in RI=$\upsilon$, the same L ports out of K beamformed ports are selected. Hence, $W_{1,l_1}=W_{1,l_2}$; $l_1,l_2\in\{1, 2, \ldots \upsilon\}$, $l_1\neq l_2$.

In another option under this example, ports are independently selected by selection matrices $W_{1,l}$ of all layers in a given rank, RI=$\upsilon$. Additionally, the ports are independently selected at each layer for SD-FD joint selection. Hence, $W_{1,l_1}=W_{1,l_2}$; $l_1,l_2\in\{1, 2, \ldots \upsilon\}$, $l_1\neq l_2$.

There are a few items of note in the foregoing examples and options under the fourth example embodiment. As a first note, ports associated with SD beams and FD bases may be freely selected or selected as defined in Rel. 15/16, as discussed above. As a second note, it is possible to configure no port selection for all layers. In that case, UE reports only $W_2$ associated with each layer. As a third note, out of the above two options under this fourth example embodiment, one option may be configured using higher-layer signaling or DCI. It is also possible that the specifications directly define one option.

Wireless Communication System

Figure 5:
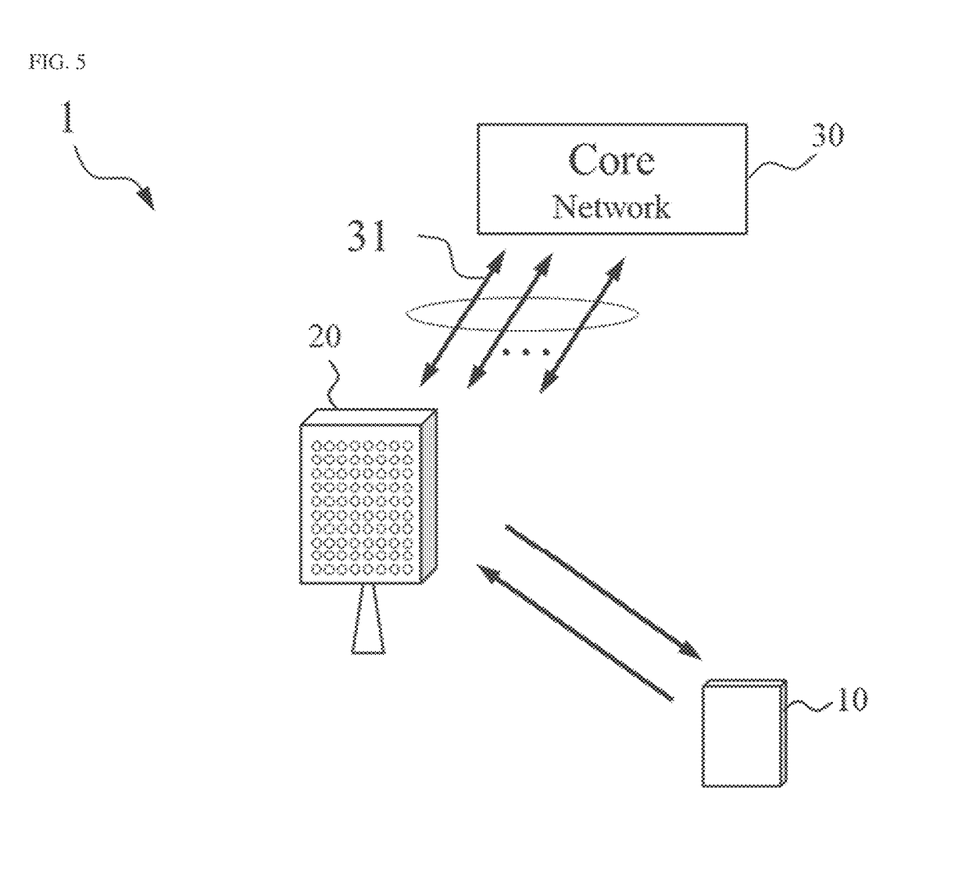
FIG. 5 shows an example of a wireless communication system according to one or more embodiments.

FIG. 5 is a wireless communications system 1 according to one or more embodiments of the present invention. The wireless communication system 1 includes a user equipment (UE) 10, a base station (BS) 20, and a core network 30. The wireless communication system 1 may be a NR system. The wireless communication system 1 is not limited to the specific configurations described herein and may be any type of wireless communication system such as an LTE/LTE-Advanced (LTE-A) system, or 5G/NR system.

The BS 20 may communicate uplink (UL) and downlink (DL) signals with the UE 10 in a cell of the BS 20. The DL and UL signals may include control information and user data. The BS 20 may communicate DL and UL signals with the core network 30 through backhaul links 31. The BS 20 may be gNodeB (gNB). The BS 20 may be referred to as a network (NW) 20. For example, the BS 20 may transmit DL signals such as a CSI-RS and DCI.

The BS 20 includes antennas, a communication interface to communicate with an adjacent BS 20 (for example, X2 interface), a communication interface to communicate with the core network 30 (for example, S1 interface), and a CPU (Central Processing Unit) such as a processor or a circuit to process transmitted and received signals with the UE 10. Operations of the BS 20 may be implemented by the processor processing or executing data and programs stored in a memory. However, the BS 20 is not limited to the hardware configuration set forth above and may be realized by other appropriate hardware configurations as understood by those of ordinary skill in the art. Numerous BSs 20 may be disposed so as to cover a broader service area of the wireless communication system 1.

The UE 10 may communicate DL and UL signals that include control information and user data with the BS 20 using Multi Input Multi Output (MIMO) technology. The UE 10 may be a mobile station, a smartphone, a cellular phone, a tablet, a mobile router, or information processing apparatus having a radio communication function such as a wearable device. The wireless communication system 1 may include one or more UEs 10. For example, the UE 10 may transmit UL signals such as an SRS and CSI report.

The UE 10 includes a CPU such as a processor, a RAM (Random Access Memory), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

Configuration of BS

Figure 6:
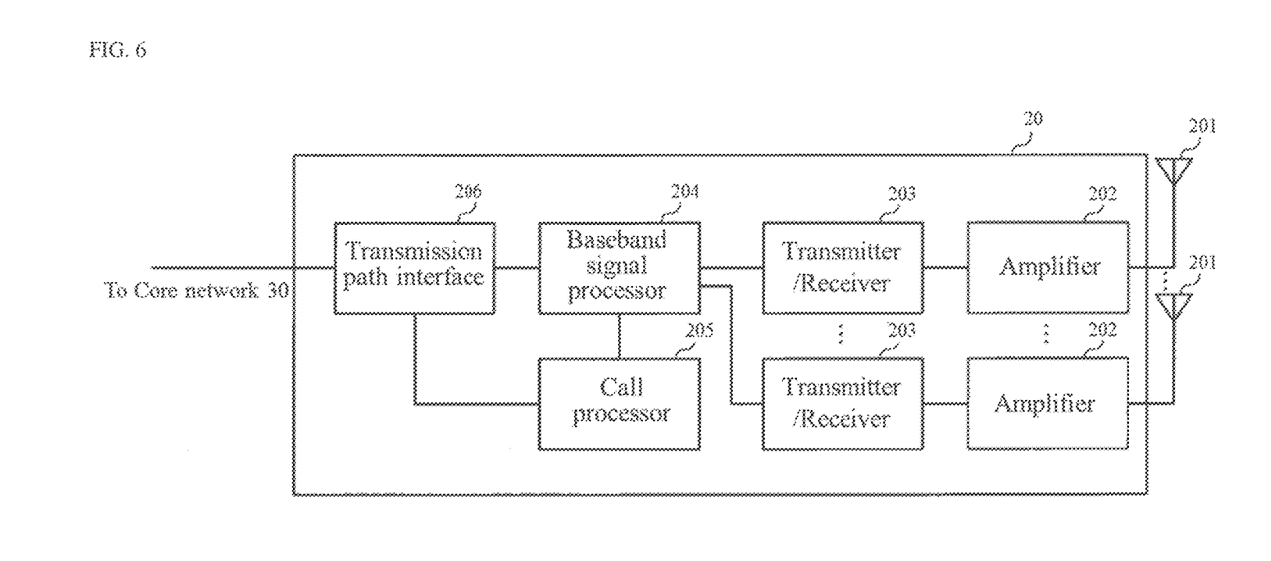
FIG. 6 shows an example of a configuration of a base station according to one or more embodiments.

The BS 20 according to embodiments of the present invention will be described below with reference to FIG. 6. FIG. 6 is a diagram illustrating a schematic configuration of the BS 20 according to embodiments of the present invention. The BS 20 may include a plurality of antennas (antenna element group) 201, amplifier 202, transceiver (transmitter/receiver) 203, a baseband signal processor 204, a call processor 205 and a transmission path interface 206.

User data that is transmitted on the DL from the BS 20 to the UE 20 is input from the core network, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and pre-coding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., Radio Resource Control (RRC) signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201. The transceiver 203 can be constituted with transmitters/receivers, transmitting/receiving circuits, or a transmitting/receiving apparatus that can be described based on a general understanding of the technical field to which the present disclosure pertains. Note that each transceiver 203 may be structured as a transmitter/receiver in one entity, or may be constituted with a separate transmitter and a receiver.

As for data to be transmitted on the UL from the UE 10 to the BS 20, radio frequency signals are received in each of antennas 201, amplified in the amplifier 202, subjected to frequency conversion and converted into baseband signals in the transceiver 203, and are input to the baseband signal processor 204.

The transmission path interface 206 transmits and/or receives signals to and/or from the core network 30 via a certain interface. The transmission path interface 206 may transmit and/or receive signals (backhaul signaling) with the BS 20 via an inter-base station interface (for example, an optical fiber in compliance with the CPRI (Common Public Radio Interface) and an X2 interface).

Note that each transceiver 203 may further include an analog beam forming section that implements analog beam forming. The analog beam forming section can be constituted with analog beam forming circuits (for example, phase shifters or phase shift circuits) or analog beam forming apparatus (for example, a phase shifter) that can be described based on general understanding of the technical field to which the present invention pertains. The antennas 201 can be constituted with, for example, an array antenna. The transceiver 203 is configured to be able to employ single beam forming (BF) or multi-BF.

The transceiver 203 may transmit signals by using a transmit beam or may receive signals by using a receive beam. The transceiver 203 may transmit and/or receive signals by using a certain beam. The transceiver 203 may transmit beamformed CSI-RS ports that may include SD beams and FD bases. The transceiver 203 may receive a number of SD beam selection and a number FD base section from the UE 10.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network through the transmission path interface 206. The call processor 205 performs call processing such as setting up and releasing a communication channel, manages the state of the BS 20, and manages the radio resources.

Configuration of UE

The UE 10 according to embodiments of the present invention will be described below with reference to FIG. 7.

Figure 7:
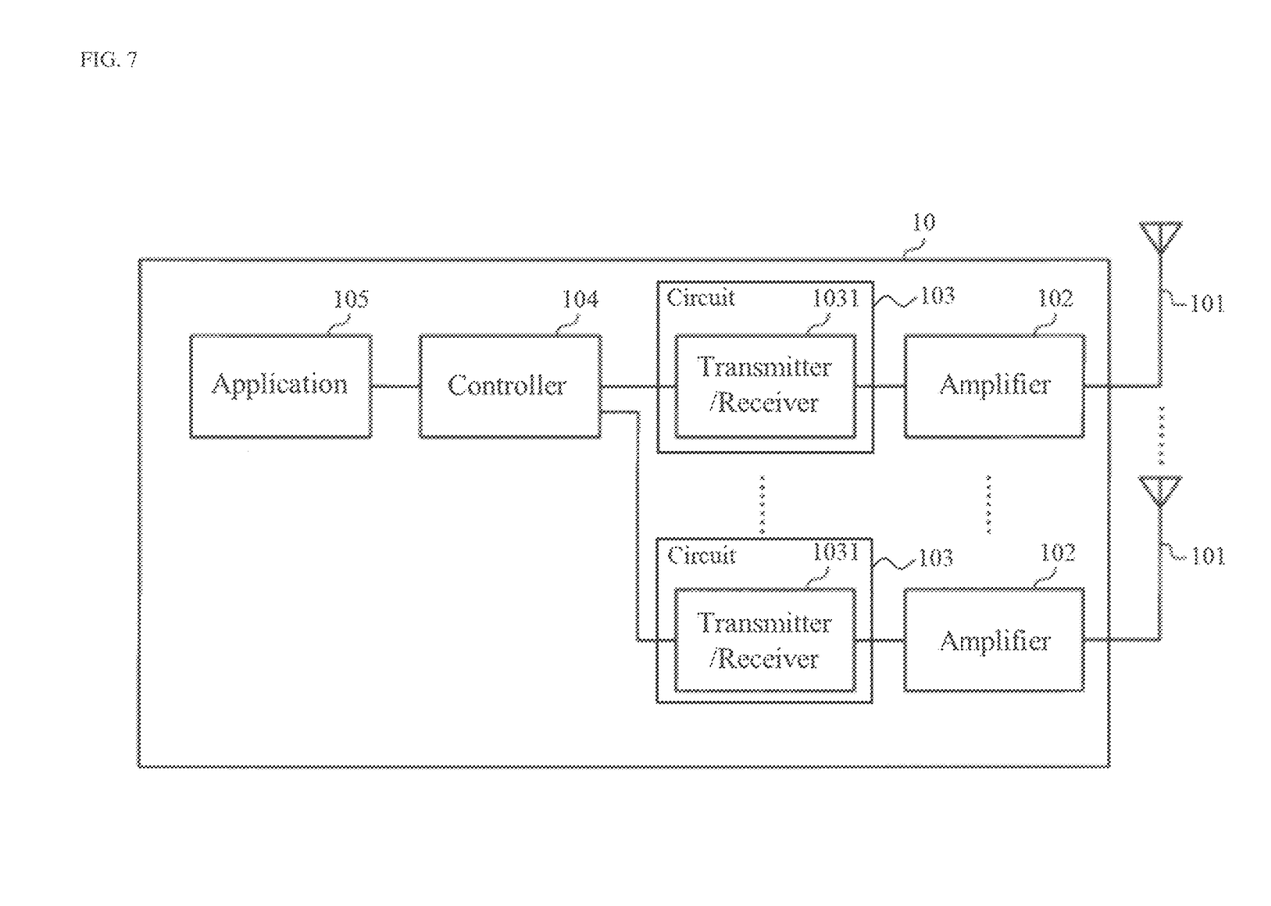
FIG. 7 shows an example of a configuration of a user equipment according to one or more embodiments.

FIG. 7 is a schematic configuration of the UE 10 according to embodiments of the present invention. The UE 10 has a plurality of UE antennas 101, amplifiers 102, the circuit 103 comprising transceiver (transmitter/receiver) 1031, the controller 104, and an application 105.

As for downlink signal, radio frequency signals received in the UE antenna 101 are amplified in the respective amplifiers 102, and subjected to frequency conversion into baseband signals in the transceiver 1031. The transceiver 1031 can be constituted with transmitters/receivers, transmitting/receiving circuits, or a transmitting/receiving apparatus that can be described based on a general understanding of the technical field to which the present disclosure pertains. Note that each transceiver 1031 may be structured as a transmitter/receiver in one entity, or may be constituted with a separate transmitter and a receiver.

These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

Note that each transceiver 1031 may further include an analog beam forming section that implements analog beam forming. The analog beam forming section can be constituted with analog beam forming circuits (for example, phase shifters or phase shift circuits) or analog beam forming apparatus (for example, a phase shifter) that can be described based on general understanding of the technical field to which the present invention pertains. The antenna 101 can be constituted with, for example, an array antenna. The transceiver 1031 is configured to be able to employ single BF or multi-BF.

The controller 104, for example, controls receiving and transmitting beams and data by the transceiver 1031. The controller 104 controls the configuration of ports and selection of a port so on.

The transceiver 1031 may receive beamformed CSI-RS ports comprising SD beams and FD bases. The controller 104 may configure a number of SD beam selection and a number of FD base selection. The controller 104 may select a value for the number of SD beam selection and another value for the number of FD base selection.

The controller 104 may configure a number of SD beam selection and a number of FD base selection jointly. The controller 104 may configure a number of SD beam selection and a number of FD base selection using downlink control information (DCI). The controller 104 may select a set of values for the number of SD beam selection and a set of values for the number of FD base selection from a plurality of sets of values.

When SD beams include two parameters, the controller 104 may configure a first parameter directly using higher layer signaling or DCI, and derive a second parameter from a configured number of CSI-RS ports. The controller 104 may configure a first number of ports out of the SD beams and a second number of ports out of the FD bases per layer. The controller 104 may configure a layer-common assignment for the first number of ports and the second number of ports.

The controller 104 may configure a layer-group-specific assignment for the first number of ports and the second number of ports. When a group size is 1, the controller 104 may configure a layer-specific assignment for the first number of ports and the second number of ports.

The controller 104 may select one or more ports for the SD beams and the FD bases separately for each layer. The controller 104 may select the one or more ports independently for each layer for selecting the SD beams and the FD bases. One or more of the one or more ports may be common for selecting the SD beams and the FD bases of all layers.

The controller 104 may select one or more ports for the SD beams and the FD bases jointly for each layer. The controller 104 may select the one or more ports independently for each layer for selecting SD beams and FD bases pairs. One or more of the one or more ports may be common for selecting the SD beams and FD bases pairs of all layers.

Hardware Structure

Note that the block diagrams that have been used to describe the above present embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 8:
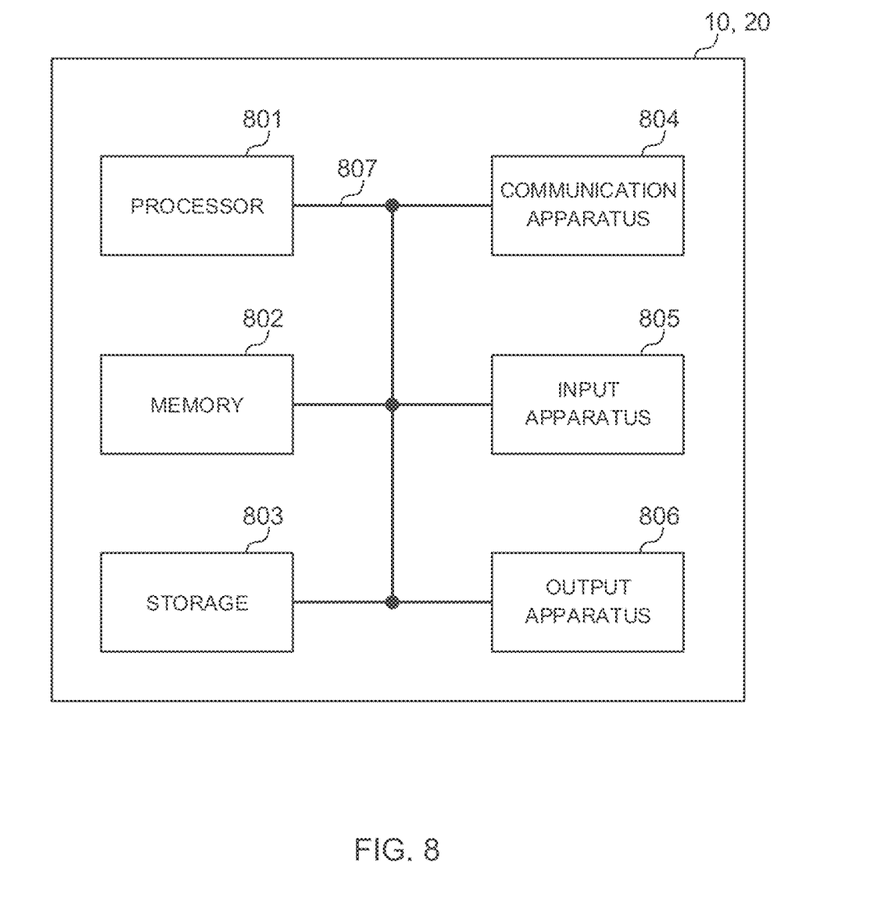
FIG. 8 is a diagram to show an example of a hardware structure of the radio base station and the user terminal.

For example, a radio base station, a user terminal, and so on according to the embodiments of the present disclosure may function as a computer that executes the processes of the aspects of the present embodiment. FIG. 8 is a diagram to show an example of a hardware structure of the radio base station and the user terminal according to one or more embodiments. Physically, the above-described radio base station 10 and user terminals 20 may each be formed as computer apparatus that includes a processor 801, a memory 802, a storage 803, a communication apparatus 804, an input apparatus 805, an output apparatus 806, a bus 807, and so on.

Note that, in the following description, the word "apparatus" may be interpreted as "circuit," "device," "unit," and so on. The hardware structure of BS 20 and the UE 10 may be designed to include one or a plurality of apparatuses shown in the drawings, or may be designed not to include part of pieces of apparatus.

For example, although only one processor 801 is shown, a plurality of processors may be provided. Furthermore, processes may be implemented with one processor or may be implemented at the same time, in sequence, or in different manners with one or more processors. Note that the processor 801 may be implemented with one or more chips.

Each function of the BS 20 and the UE 10 is implemented, for example, by allowing certain software (programs) to be read on hardware such as the processor 801 and the memory 802, and by allowing the processor 801 to perform calculations to control communication via the communication apparatus 804 and read and/or write data in the memory 802 and the storage 803.

The processor 801 controls the whole computer by, for example, running an operating system. The processor 801 may be configured with a central processing unit (CPU), which includes interfaces with peripheral apparatus, control apparatus, computing apparatus, a register, and so on. For example, the above-described baseband signal processor 204, call processor 205, and so on may be implemented by the processor 801.

Furthermore, the processor 801 reads programs (program codes), software modules, data, and so on from the storage 803 and/or the communication apparatus 804, into the memory 802, and executes various processes according to these. As for the programs, programs to allow computers to execute at least part of the operations of the above-described embodiments are used. For example, the controller 104 of UE 10 may be implemented by control programs that are stored in the memory 802 and that operate on the processor 801, and other functional blocks may be implemented likewise.

The memory 802 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 802 may be referred to as a "register," a "cache," a "main memory (primary storage apparatus)" and so on. The memory 802 can store executable programs (program codes), software modules, and/or the like for implementing a radio communication method according to the present embodiment.

The storage 803 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 803 may be referred to as "secondary storage apparatus."

The communication apparatus 804 is hardware (transmitting/receiving device) for allowing inter-computer communication via wired and/or wireless networks, and may be referred to as, for example, a "network device," a "network controller," a "network card," a "communication module" and so on. The communication apparatus 804 may be configured to include a high frequency switch, a duplexer, a filter, a frequency synthesizer, and so on in order to realize, for example, frequency division duplex (FDD) and/or time division duplex (TDD). For example, the above-described antennas 101 (201), amplifier 102 (202), transmitter/receiver 1031 (203), transmission path interface 106, and so on may be implemented by the communication apparatus 804.

The input apparatus 805 is an input device that receives input from the outside (for example, a keyboard, a mouse, a microphone, a switch, a button, a sensor, and so on). The output apparatus 806 is an output device that allows sending output to the outside (for example, a display, a speaker, an LED (Light Emitting Diode) lamp, and so on). Note that the input apparatus 805 and the output apparatus 806 may be provided in an integrated structure (for example, a touch panel).

Furthermore, these types of apparatus, including the processor 801, the memory 802, and others, are connected by a bus 807 for communicating information. The bus 807 may be formed with a single bus, or may be formed with buses that vary between pieces of apparatus.

Also, the BS 20 and the UE 10 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 801 may be implemented with at least one of these pieces of hardware.

Variation

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/present embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/present embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

One or more embodiments illustrated in this specification may be used individually or in combinations, which may be switched depending on the mode of implementation. The order of processes, sequences, flowcharts, and so on that have been used to describe the aspects/present embodiments herein may be re-ordered as long as inconsistencies do not arise. For example, although various methods have been illustrated in this specification with various components of steps in exemplary orders, the specific orders that are illustrated herein are by no means limiting.

One or more embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, assuming, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the invention defined by the recitations of claims. Consequently, the description in this specification is provided only for the purpose of explaining examples, and should by no means be construed to limit the invention according to the present invention in any way.

Alternative Examples

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A terminal comprising:
    a receiver that receives a first higher layer parameter relating to a parameter for a spatial domain (SD) associated with a precoder for a type II port selection codebook and a second higher layer parameter relating to a parameter for a frequency domain (FD) associated with the precoder;
    a processor that determines, based on the first higher layer parameter and the second higher layer parameter, the parameter for the SD and the parameter for the FD to be included in a PMI; and
    a transmitter that reports the PMI,
    wherein both the parameter for the SD and the parameter for the FD are common to all layers from 1 to 4 indicated by a rank indicator (RI).

2. A radio communication method for a terminal, comprising:
    receiving a first higher layer parameter relating to a parameter for a spatial domain (SD) associated with a precoder for a type II port selection codebook and a second higher layer parameter relating to a parameter for a frequency domain (FD) associated with the precoder;
    determining, based on the first higher layer parameter and the second higher layer parameter, the parameter for the SD and the parameter for the FD to be included in a PMI; and
    reporting the PMI,
    wherein both the parameter for the SD and the parameter for the FD are common to all layers from 1 to 4 indicated by a rank indicator (RI).

3. A base station comprising:
    a transmitter that transmits, to a terminal, a first higher layer parameter relating to a parameter for a spatial domain (SD) associated with a precoder for a type II port selection codebook and a second higher layer parameter relating to a parameter for a frequency domain (FD) associated with the precoder; and
    a processor that controls a reception of a PMI including the parameter for the SD and the parameter for the FD determined by the terminal based on the first higher layer parameter and the second higher layer parameter,
wherein both the parameter for the SD and the parameter for the FD are common to all layers from 1 to 4 indicated by a rank indicator (RI).

4. A system comprising a terminal and a base station, wherein
the terminal comprises:
a receiver that receives a first higher layer parameter relating to a parameter for a spatial domain (SD) associated with a precoder for a type II port selection codebook and a second higher layer parameter relating to a parameter for a frequency domain (FD) associated with the precoder;
a processor that determines, based on the first higher layer parameter and the second higher layer parameter, the parameter for the SD and the parameter for the FD to be included in a PMI; and
a transmitter that reports the PMI,
wherein both the parameter for the SD and the parameter for the FD are common to all layers from 1 to 4 indicated by a rank indicator (RI), and
the base station comprises:
a transmitter that transmits, to the terminal, the first higher layer parameter and the second higher parameter; and
a processor that controls a reception of the PMI.

* * * * *